United States Patent
Kim et al.

(10) Patent No.: US 11,666,803 B2
(45) Date of Patent: Jun. 6, 2023

(54) METHOD OF GOLF BALL MANUFACTURE EMPLOYING ULTRASONIC WELDING, AND RESULTING GOLF BALL AND GOLF BALL COMPONENTS AND/OR LAYERS

(71) Applicants: Masion de Golf, Carlsbad, CA (US); Qingdao SM Parker Golf Ltd., Qingdao (CN)

(72) Inventors: Hyun Jin Kim, Carlsbad, CA (US); Ki Jung Kim, Busan (KR)

(73) Assignees: Masion de Golf, Carlsbad, CA (US); Qingdao SM Parker Golf Ltd., Qingdao (CN)

( * ) Notice: Subject to any disclaimer, the term of this patent is extended or adjusted under 35 U.S.C. 154(b) by 0 days.

(21) Appl. No.: 16/793,984

(22) Filed: Feb. 18, 2020

(65) Prior Publication Data

US 2021/0252343 A1 Aug. 19, 2021

(51) Int. Cl.
*A63B 37/00* (2006.01)
*B29D 99/00* (2010.01)

(52) U.S. Cl.
CPC ...... *A63B 37/0087* (2013.01); *A63B 37/0032* (2013.01); *A63B 37/0033* (2013.01); *A63B 37/0058* (2013.01); *A63B 37/0063* (2013.01); *A63B 37/0065* (2013.01); *A63B 37/0078* (2013.01); *B29D 99/0042* (2013.01); *A63B 37/0075* (2013.01); *A63B 37/0076* (2013.01)

(58) Field of Classification Search
CPC ...................................................... A63B 45/00
USPC .......................................................... 473/409
See application file for complete search history.

(56) References Cited

U.S. PATENT DOCUMENTS

| | | | |
|---|---|---|---|
| 3,284,257 A | 11/1966 | Soloff et al. | |
| 5,150,906 A | 9/1992 | Molitor et al. | |
| 5,306,760 A | 4/1994 | Sullivan | |
| 5,855,706 A | 1/1999 | Grewell | |
| 6,056,842 A | 5/2000 | Dalton et al. | |
| 6,213,894 B1 * | 4/2001 | Sullivan ............. | A63B 37/0003 473/373 |
| 6,299,550 B1 * | 10/2001 | Molitor ............... | B29C 66/1162 473/354 |
| 6,562,906 B2 | 5/2003 | Chen | |
| 7,878,926 B2 | 2/2011 | Kim et al. | |
| 7,901,299 B2 | 3/2011 | Kim et al. | |
| 8,177,665 B2 | 5/2012 | Loper et al. | |
| 8,785,561 B2 | 7/2014 | Kim et al. | |
| 9,108,082 B2 | 8/2015 | Kim et al. | |
| 9,220,949 B2 | 12/2015 | Kim et al. | |
| 9,421,425 B2 | 8/2016 | Loper et al. | |
| 2003/0232666 A1 * | 12/2003 | Sullivan ................. | A63B 37/12 473/378 |

(Continued)

*Primary Examiner* — Raeann Gorden
(74) *Attorney, Agent, or Firm* — Squire Patton Boggs (US) LLP

(57) ABSTRACT

A golf ball a core, one or more intermediate layers, and one or more cover layers. The core may comprise an inner portion and an outer portion. One or more layers of the golf ball may be formed by the application of ultrasonic welding on two half shells to form. One or more of the layers may be formed by a number of different chemical compositions, and may have varying thicknesses, hardnesses, coefficients of restitution, and PGA compression. The golf ball itself may have varying coefficient of restitution and PGA compression, depending on the layers.

23 Claims, 6 Drawing Sheets

(56) References Cited

U.S. PATENT DOCUMENTS

| | | | |
|---|---|---|---|
| 2006/0172823 A1* | 8/2006 | Loper | C08L 23/0869 |
| | | | 473/371 |
| 2008/0096692 A1* | 4/2008 | Kennedy, III | A63B 37/0031 |
| | | | 473/373 |
| 2010/0125002 A1 | 5/2010 | Kim et al. | |
| 2014/0274466 A1* | 9/2014 | Mochizuki | A63B 37/0023 |
| | | | 473/371 |

\* cited by examiner

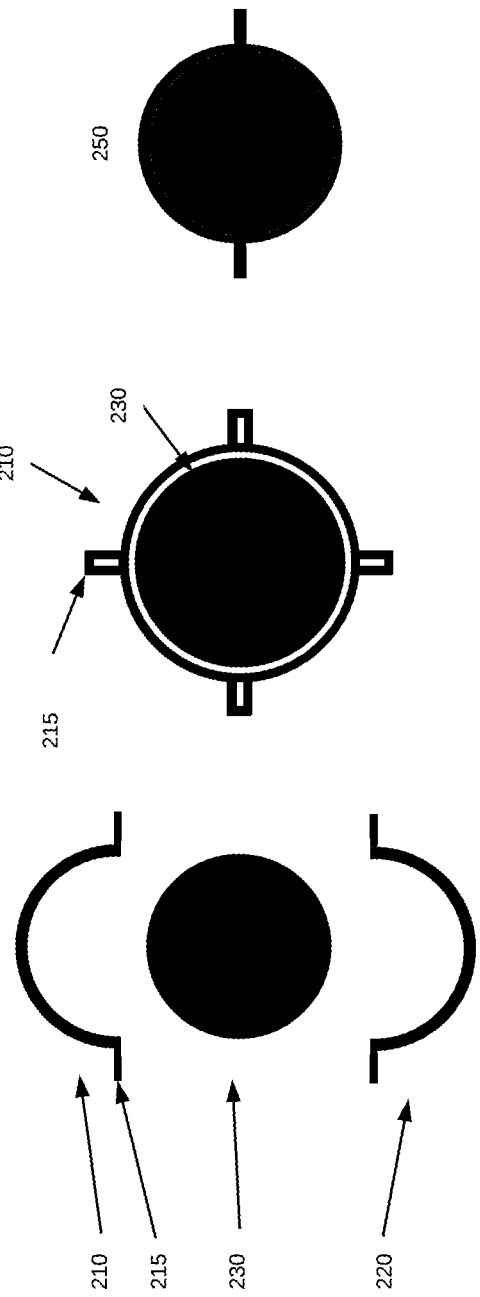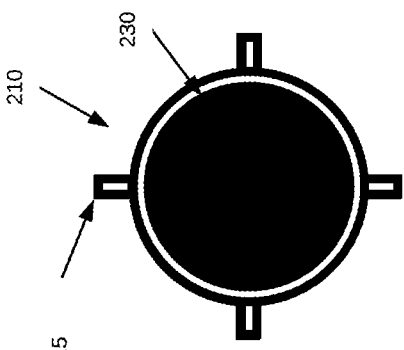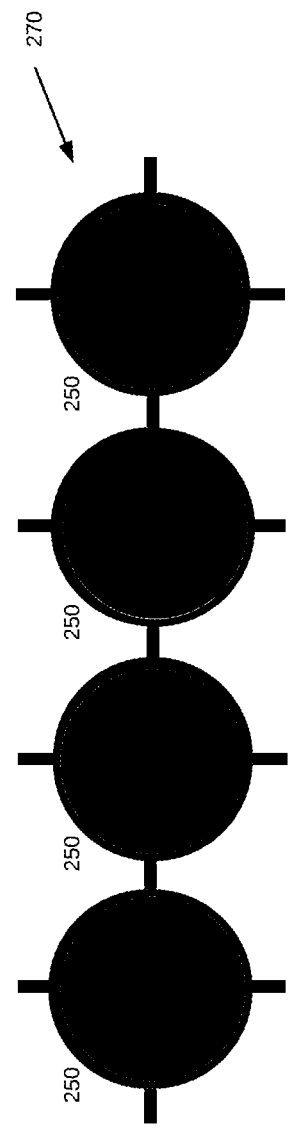
FIG. 2A
FIG. 2B
FIG. 2C
FIG. 2D

METHOD OF GOLF BALL MANUFACTURE EMPLOYING ULTRASONIC WELDING, AND RESULTING GOLF BALL AND GOLF BALL COMPONENTS AND/OR LAYERS

CROSS-REFERENCE TO RELATED APPLICATIONS

The present application is related to U.S. application Ser. Nos. 16/201,967 and 16/201,962, both filed Nov. 27, 2018, and both incorporated herein by reference in their entireties.

BACKGROUND OF THE INVENTION

Field of the Invention

The present invention relates to golf ball manufacture. More particularly, the invention relates to golf ball manufacture employing flexible design while achieving consistency in manufacture to produce a high performance golf ball with a cover having uniform thickness and/or one or more intermediate layers of varying thickness. Still more particularly, the invention relates to golf ball manufacture employing ultrasonic welding to achieve the above-mentioned goals, and to golf balls and components thereof made by a method employing ultrasonic welding.

Description of the Conventional Art

Conventionally, golf ball manufacturers have employed at least three different processes to form either the cover or one or more of the intermediate layers of a golf ball. Such processes include injection molding, compression molding, and casting. In injection molding, a golf ball core or a mantled core is located in a cavity, with the core held by pins at the center of the cavity. Molten resin is injected into the cavity, and when the resin has hardened sufficiently, the pins retract to complete the process. Injection molding is simple and convenient. However, one problem is that if, for example, the pins are retracted before the resin has hardened sufficiently, the core or mantle core can shift, resulting in an off center core and uneven layer thickness. Another problem is the limitation on layer thickness that can be achieved through injection molding process. It is difficult to injection mold a thin layer. This limitation constrains golf ball design and construction, and diminishes performance of the resulting golf ball with respect to spin characteristic, flight dispersion, shot accuracy, and impact endurance.

In compression molding, two half shells are compressed together to form an intermediate layer or a cover layer. However, one problem with this type of construction method is that the material forming an inner layer can flow out during the process, and even can flow through an outer layer along the parting line or mating area, usually near the ball's equator, resulting in uneven inner-layer and/or outer layer thickness. The uneven layer thickness likewise negatively affects performance of the resulting golf ball in areas such as shot accuracy, flight performance, and impact endurance.

In casting, a mixture of a reactive chemical and a liquid type resin is poured or injected into each half-shell of a book-mold, the core or mantled core is located within the mold, and book-mold is closed to complete the molding process with a chemical reaction of a mixture. Since this process uses a liquid type resin, it is possible to mold a thin layer. However, one problem is that it can be challenging to control the centering of a core or mantle, and to control the layer thickness, again adversely affecting performance of the resulting golf ball in areas such as shot accuracy, flight performance, and impact endurance. Another problem is the limitation on material selection, because only a liquid type resin can be used in the casting process.

SUMMARY OF THE INVENTION

The present invention has been developed to overcome the above described disadvantages, producing a golf ball with uniform layer thickness, consistent golf ball manufacture and corresponding performance, and excellent durability. To accomplish these and other goals, in accordance with aspects of the invention, a golf ball manufacturing method employs ultrasonic welding to fuse two half shells together. Welding the half shells can form the golf ball's outer layer, or one of the intermediate layers.

Aspects of the invention also relate to a golf ball, and components thereof, manufactured according to the techniques disclosed herein.

BRIEF DESCRIPTION OF DRAWINGS

The foregoing and other aspects and features according to embodiments of the present invention now will be described in detail with reference to the accompanying drawings, in which:

FIGS. 2A-2D show the use of shells for succeeding layers of a golf ball, assembled using ultrasonic welding according to an embodiment;

DETAILED DESCRIPTION

Figure 1:
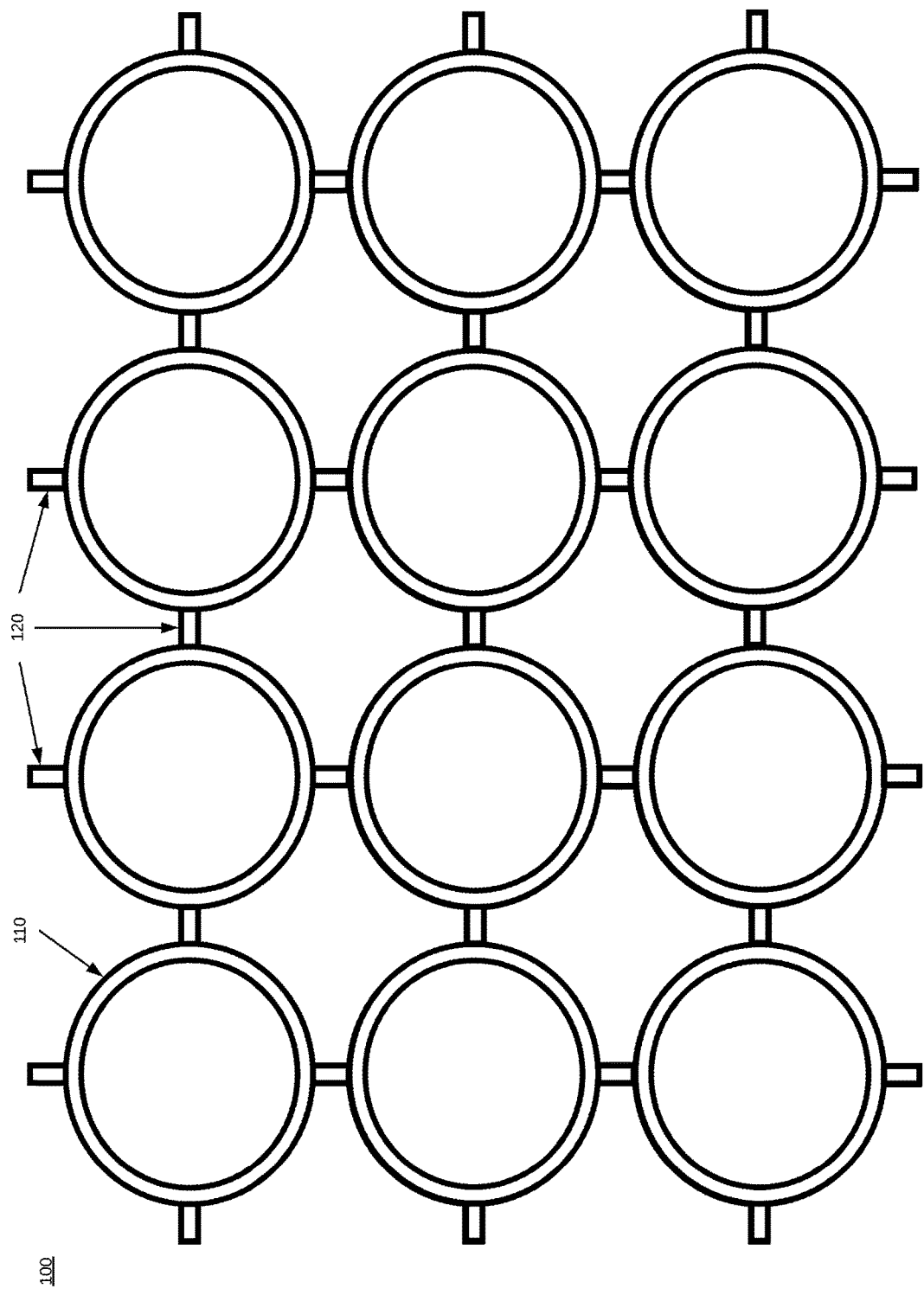
FIG. 1 shows a form of shells used for layers of a golf ball according to an embodiment.

According to embodiments, a golf ball may comprise at least one core and at least one cover layer, wherein the cover layer comprises two half shells fused by ultrasonic welding and compression molding to complete the cover molding with dimples. The cover layer may comprise one or more materials selected from the group consisting of thermoplastic resin, thermoset elastomer, thermoplastic elastomer, and unsaturated polymer. In some aspects, the cover layer may comprise one or more materials selected from the group consisting of ionomer, polyurethane, and polyurethane urea.

In some aspects, the core may comprise an inner and an outer portion. In other aspects, the cover may comprise an inner and an outer cover layer. In some aspects, there may be one or more intermediate layers between one or more cover layers and one or more core portions. Many golf balls on the market may be three-piece or four-piece balls. What the different layers are called may be as much a matter of their composition and physical characteristics as anything else. The name of the layer is less than its composition and physical characteristics.

In some aspects, the cover layer or an inner and/or outer cover layer, the intermediate layer or an inner and/or outer intermediate layer, or the core or an outer core layer and/or the core may comprise thermoplastic resin selected from the group consisting of polyester resins, polyamide elastomer resins, polyurethane, polyurethane-urea, polyurea, polyamide ionomer, polyurethane ionomer, thermoplastic copolyetherester block copolymer, thermoplastic copolyesterester block copolymer, synthetic rubber, thermoplastic vulcanizate, ionomer, polycarbonate, polyolefin, polyamide, copolymeric polyamide, polyester, polyvinyl alcohol, acrylonitrile-butadiene-styrene copolymer, polyarylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, ethylene-octene copolymer, butylene-octene copolymer, or polysiloxane. One or more of these layers also may comprise organic fillers, inorganic fillers, nano-filler, graphene, or carbon nanotube, or combinations thereof.

According to embodiments, the cover layer or an inner and/or outer cover layer, the intermediate layer or an inner and/or outer intermediate layer, or the core or an outer core layer and/or the core may comprise an ionomer selected from the group consisting of a copolymeric ionomer, a terpolymeric ionomer, a partially neutralized ionomer, a fully neutralized ionomer, a unimodal ionomer, a bimodal ionomer, a modified unimodal ionomer, a modified bimodal ionomer selected from the group consisting of: (a) an ionomeric polymer comprising one or more E/X/Y copolymers, wherein E is ethylene, X is a C3 to C8 $\alpha,\beta$ ethylenically unsaturated carboxylic acid, and Y is a softening comonomer selected from the group consisting of alkyl acrylate and alkyl methacrylate, wherein the alkyl groups have from 1 to 8 carbon atoms, or ionomers of such E/X/Y copolymers, wherein X is in the range of about 5 to about 35 weight % of the E/X/Y copolymer and Y is in the range of 0 to about 50 weight % of the E/X/Y copolymer, and wherein the acid groups present in the ionomeric polymer are partially neutralized with a metal selected from the group consisting of zinc, sodium, lithium, calcium, magnesium, and combinations thereof; or (b) a bimodal ionomeric polymer comprising: (i) a high molecular weight component having a molecular weight in the range of about 80,000 to about 500,000 and comprising one or more ethylene/$\alpha,\beta$-ethylenically unsaturated C3-8 carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof, and (ii) a low molecular weight component having a molecular weight in the range of about 2,000 to about 30,000 and comprising one or more ethylene/$\alpha,\beta$-ethylenically unsaturated C3-8 carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof; or (c) a modified ionomeric polymer comprising: (i) a blend composition comprising: (1) ethylene, (2) 5 to 25 weight percent (meth)acrylic acid (based on the total weight of the modified ionomeric polymer), and (3) 0 to 40 weight percent of a C1 to C8-alkyl acrylate (based on the total weight of the modified ionomeric polymer), and (4) about 5 to about 45 weight percent (based on the total weight of the modified ionomeric polymer) of a fatty acid or one or more metal salts of a fatty acid, or (ii) a bimodal polymer blend composition comprising: (1) a high molecular weight component having a molecular weight in the range of about 80,000 to about 500,000 and comprising one or more ethylene/$\alpha,\beta$-ethylenically unsaturated C3-8 carboxylic acid copolymers and/or one or more ethylene, alkyl (meth)acrylate, (meth)acrylic acid terpolymers, wherein the high molecular weight component is partially neutralized with metal ions selected from the group consisting of lithium, sodium, zinc, calcium, magnesium, and combinations thereof, (2) a low molecular weight component having a molecular weight in the range of about 2,000 to about 30,000 and comprising one or more ethylene/$\alpha,\beta$-ethylenically unsaturated C3-8 carboxylic acid copolymers and/or one or more ethylene, alkyl (meth)acrylate, (meth)acrylic acid terpolymers, wherein the low molecular weight component is partially neutralized with metal ions selected from the group consisting of lithium, sodium, zinc, calcium, magnesium, and combinations thereof, and (3) about 5 to about 45 weight percent (based on the total weight of the modified ionomeric polymer) of a fatty acid or one or more metal salts of a fatty acid; or (d) a blend composition comprising the reaction product of: (i) one or more ionomers, and (ii) a compound having a general formula (R2N)m-R'—(X(O)nORy)m, wherein R is selected from the group consisting of (1) hydrogen, (2) one or more C1-C20 aliphatic systems, (3) one or more cycloaliphatic systems, (4) one or more aromatic systems, and (5) combinations thereof, wherein R' is a bridging group comprising (1) one or more unsubstituted C1-C20 straight chain or branched aliphatic or alicyclic groups, or (2) one or more substituted straight chain or branched aliphatic or alicyclic groups, or (3) one or more aromatic groups, or (4) one or more oligomers each containing up to 12 repeating units, wherein when X═C or S or P, m is 1-3, wherein when X═C, n=1 and y=1, wherein when X═S, n=2 and y=1, and wherein when X═P, n=2 and y=2; or (e) combinations of (a), (b), (c), and (d).

According to embodiments, the cover layer or an inner and/or outer cover layer, the intermediate layer or an inner and/or outer intermediate layer, or the core or an outer core layer and/or the core may comprise one or more materials selected from the group consisting of: (a) a polyalkenamer having from about 50 to about 99 of its double bonds in the trans-configuration, a molecular weight from about 10,000 to about 300,000, and a degree of crystallization from about 5 to about 70; (b) a cross-linking agent that is present in an amount of from about 0.05 to about 5 parts by weight of the cross-linking agent per 100 parts by weight of the polyalkenamer, or from about 1 to about 40 parts by weight per 100 parts by weight of the polyalkenamer; (c) a peptizer, which (i) may be present in an amount of from about 0.1 to about 7 parts by weight per 100 parts by weight of the polyalkenamer, and (ii) may be selected from the group consisting of pentachlorothiophenol, dibenzamido diphenyldisulfide, tetrachloropyridinethiol, a metal salt of pentachlorothiophenol, non-metal salt of pentachlorothiophenol; (d) an accelerator, which may be present in an amount of from about 0.1 to about 10 parts by weight per 100 parts by weight of the polyalkenamer; and (e) the filler, which (i) may be present in an amount of from about 1 to about 50 parts by weight per 100 parts by weight of the polyalkenamer, and (ii) may be selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof.

According to embodiments, the cover layer or an inner and/or outer cover layer, the intermediate layer or an inner and/or outer intermediate layer, or the core or an outer core layer and/or the core may comprise one or more materials selected from the group consisting of one or more of the following categories (each identified with a boldface header):

Olefinic Thermoplastic Elastomers

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers.

Co-Polyester Thermoplastic Elastomers

Examples of copolyester thermoplastic elastomers include, without limitation, polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these.

Polyamide Elastomer

Examples of polyamide elastomers within the scope of the present invention include, without limitation, polyether amide elastomers, which result from the copolycondensation of polyamide blocks having reactive chain ends with polyether blocks having reactive chain ends, including: 1) polyamide blocks of diamine chain ends with polyoxyalkylene sequences of dicarboxylic chain ends; 2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and 3) polyamide blocks of dicarboxylic chain ends with polyether diols, the products obtained, in this particular case, being polyetheresteramides.

The polyamide blocks of dicarboxylic chain ends come, for example, from the condensation of alpha-omega aminocarboxylic acids of lactam or of carboxylic diacids and diamines in the presence of a carboxylic diacid which limits the chain length.

The molecular weight of the polyamide sequences preferably is between about 300 and about 15,000, and more preferably between about 600 and about 5,000. The molecular weight of the polyether sequences preferably is between about 100 and about 6,000, and more preferably between about 200 and about 3,000.

The amide block polyethers also may comprise randomly distributed units. These polymers may be prepared by the simultaneous reaction of polyether and precursor of polyamide blocks.

For example, the polyether diol may react with a lactam (or alpha-omega amino acid) and a diacid which limits the chain in the presence of water. A polymer is obtained having mainly polyether blocks, polyamide blocks of very variable length, but also the various reactive groups having reacted in a random manner and which are distributed statistically along the polymer chain.

Suitable amide block polyethers include, without limitation, those disclosed in U.S. Pat. Nos. 4,331,786, 4,115,475, 4,195,015, 4,839,441, 4,864,014, 4,230,838, and 4,332,920, which are incorporated herein in their entireties by reference. The polyether may be, for example, a polyethylene glycol (PEG), a polypropylene glycol (PPG), or a polytetramethylene glycol (PTMG), also designated as polytetrahydrofurane (PTHF).

The polyether blocks may be along the polymer chain in the form of diols or diamines. However, for reasons of simplification, they are designated PEG blocks, or PPG blocks, or also PTMG blocks.

It is also within the scope of the disclosed embodiments that the polyether block comprises different units such as units, which derive from ethylene glycol, propylene glycol, or tetramethylene glycol.

The amide block polyether comprises at least one type of polyamide block and one type of polyether block. Mixing two or more polymers with polyamide blocks and polyether blocks also may be used. It also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of about 1:1 to about 3:1.

Specific examples of suitable polyamides also include Nylon 6, Nylon 66, Nylon 610, Nylon 11, Nylon 12, copolymerized Nylon, Nylon MXD6, and Nylon 46.

Other Thermoplastic Elastomers

Examples of other thermoplastic elastomers include, without limitation, multiblock, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

Examples of other thermoplastic elastomers suitable for the present invention include, without limitation, those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. Other examples of these include: maleic anhydride functionalized triblock copolymer consisting of polystyrene end blocks and poly(ethylene/butylene), maleic anhydride modified ethylene-vinyl acetate copolymer, ethylene-isobutyl acrylate-methacrylic acid terpolymer, ethylene-ethyl acrylate-methacrylic anhydride terpolymer, brominated styrene-isobutylene copolymers and resins having glycidyl or maleic anhydride functional groups.

According to embodiments, the cover layer or an inner and/or outer cover layer, the intermediate layer or an inner and/or outer intermediate layer, or the core or an outer core layer and/or the core may comprise one or more materials selected from the group consisting of: polyamides obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine, and any combination of those. Specific examples of suitable polyamides include polyamide 6; polyamide 11; polyamide 12; polyamide 4/6; polyamide 6/6; polyamide 6/9; polyamide 6/10; polyamide 6/12; PA12C; polyphthalamide.

According to embodiments, the cover layer or an inner and/or outer cover layer, the intermediate layer or an inner and/or outer intermediate layer, or the core or an outer core layer and/or the core may comprise one or more materials selected from the group consisting of: (a) a reaction product of a diisocyanate with a polyol, with an optional addition of a chain extender; (b) a reaction product of isocyanate-terminated polyurethane with a polyamine, with an optional addition of a chain extender; or (c) combinations of (a) and (b).

Polyol Component

Any polyol available to one of ordinary skill in the art is suitable for use according to the invention. Polyols for use with the present invention include: polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), p-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentylglycol or 1,5-pentanediol. Polycarbonate polyols can be used either alone or in a combination with other polyols. Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Polydiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n- octadecyl acrylate copolymer. These liquid diene polymers can be obtained, for example, by heating a conjugated diene monomer in the presence of hydrogen peroxide in a liquid reactant.

Isocyanate Component

Any isocyanate available to one of ordinary skill in the art is suitable for golf balls according to aspects of the invention. Such isocyanates may include: aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPM); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetra methylene-1,2-diisocyanate; tetra methylene-1,3-diisocyanate; tetra methylene-1,4-diisocyanate; penta methylene diisocyanate; 1,6-hexa methylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-deca methylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexa ne, 1,6-diisocyanato-2,4,4-tetra-trimethyl hexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexyln-nethane 4,4'-diisocyanate, 1,4-bis(isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetra hydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzyl-isocyanate, dichlorohexamethylene diisocyanate, ω, ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}MDI$); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Diamine/Polyamine Component

Any diamine or polyamine available to one of ordinary skill in the art is suitable for use according to the invention include: aliphatic, alicyclic and/or aromatic diamines, including but not limited to tetramethylenediamine, pentamethylenediamine, hexamethylenediamine, 3,3'-dimethyl-4,4'-diamino-dicyclohexyl methane, 2,2',3,3'-tetrachloro-4,4'-diaminophenyl methane, p,p'-methylenedianiline, p-phenylenediamine, 4,4'-diaminodiphenyl, 2,4,6-tris(dimethylaminomethyl) phenol, 5-dimethylthio-2,4-toluenediamine, 3,5-dimethylthio-2,6-toluenediamine; N,N'-dialkyl-diamino diphenyl methane, 3,5-dimethylthio-2,4-toluenediamine, 3,5-dimethylthio-2,6-toluenediamine, dimethylthio-2,4-toluenediamine, diethyl-2,4-toluenediamine, 3,3'-dichloro-4,4'-diaminodiphenyl methane (MOCA); N,N,N',N'-tetrakis(2-hydroxypropyl)ethylenediamine, diethyl-2,4-toluene diamine, and any and all combinations thereof.

In one aspect, the at least one core or core layer may comprise: (a) an unsaturated polymer with a Mooney viscosity (ML1+4(100° C.)) of from about 20 to about 80, the unsaturated polymer selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, and combinations thereof; (b) a cross-linking agent that is present in an amount of from about 0.05 to about 5 parts by weight of the cross-linking agent per 100 parts by weight of the unsaturated polymer comprising; (c) a co-crosslinking agent that is present in an amount of from about 1 to about 50 parts by weight of the co-cross-linking agent per 100 parts by weight of the unsaturated polymer comprising a zinc salt or a magnesium salt of an unsaturated fatty acid having from 3 to 8 carbon atoms; (d) optionally a peptizer, which (i) may be present in an amount of from about 0.1 to about 10 parts by weight per 100 parts by weight of the unsaturated polymer, and (ii) is selected from the group consisting of pentachlorothiophenol, dibenzamido diphenyldisulfide, tetrachloropyridinethiol, a metal salt of pentachlorothiophenol, or a non-metal salt of pentachlorothiophenol; (e) optionally an accelerator, which may be present in an amount of from about 0.1 to about 10 parts by weight per 100 parts by weight of the unsaturated polymer; (f) a filler, which may be selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof; and (g) optionally miscellaneous additives which may be selected from the group of colorants, antioxidants, colorants, dispersants, mold releasing agents, processing aids, and combinations of thereof.

Unsaturated Polymer

Golf balls according to aspects of the present invention, may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

The cores of golf balls according to aspects of the present invention may also include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000.

Crosslinking Agent

Suitable cross-linking agents for use in golf balls that are made in accordance with aspects of the present invention include peroxides, sulfur compounds, or other known chemical cross-linking agents, as well as mixtures of these. Non-limiting examples of suitable cross-linking agents include primary peroxides, secondary peroxides, tertiary peroxides, aliphatic peroxides, aromatic peroxides, cyclic peroxides, or any mixtures of these. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Co-Cross-Linking Agent

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

Peptizer

The core compositions used in embodiments of the present invention may also optionally incorporate one or more of the so-called "peptizers".

According to aspects of the invention, the peptizer preferably may comprise an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides. Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Suitable peptizers also may include one or more additional functional groups, such as halogens, particularly chlorine; a sulfur-containing moiety exemplified by thiols, where the functional group is sulfhydrl (—SH), thioethers, where the functional group is —SR, disulfides, ($R_1S$—$SR_2$), etc.; and combinations of functional groups.

If the peptizer is employed in golf balls according to aspects of the present invention, the peptizer may be present in an amount from about 0.01 to about 10, preferably from about 0.10 to about 7, more preferably from about 0.15 to about 5 parts by weight per 100 parts by weight of the synthetic rubber component.

Accelerators

The core compositions can also optionally comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts. The synthetic rubber composition can further incorporate from about 0.1 part to about 10 parts by weight of the accelerator per 100 parts by weight of the rubber. More preferably, the ball composition can further incorporate from about 0.2 part to about 5 parts, and most preferably from about 0.5 part to about 1.5 parts, by weight of the accelerator per 100 parts by weight of the rubber.

Miscellaneous Additives

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include colorants, antioxidants, colorants, dispersants, mold releasing agents, processing aids, fillers, and any and all combinations thereof. Although not required, ultraviolet (UV) stabilizers, or photo stabilizers such as substituted hydroxphenyl benzotriazoles may be utilized in the present invention to enhance the UV stability of the final compositions.

According to embodiments, the golf ball may have one or more cover layers with a Shore D hardness H in a range of $20 \leq H \leq 80$, preferably $25 \leq H \leq 75$, more preferably $30 \leq H \leq 70$, still more preferably $35 \leq H \leq 65$, and yet still more preferably $40 \leq H \leq 60$.

According to embodiments, the golf ball may have one or more intermediate layers with a Shore D hardness H in a range of $20 \leq H \leq 90$, preferably $25 \leq H \leq 85$, more preferably $30 \leq H \leq 80$, more preferably $35 \leq H \leq 75$, and yet still more preferably $40 \leq H \leq 70$.

According to embodiments, a golf ball may have one or more cover layers with a thickness T in a range of 0.003 inch$\leq T \leq$0.25 inch, preferably 0.005 inch$\leq T \leq$0.2 inch, more preferably 0.01 inch$\leq T \leq$0.1 inch, still more preferably 0.02 inch$\leq T \leq$0.07 inch, and yet still more preferably 0.02 inch$\leq T \leq$0.05 inch.

According to embodiments, a golf ball may have one or more intermediate layers with a thickness T in a range of 0.003 inch$\leq T \leq$0.25 inch, preferably 0.005 inch$\leq T \leq$0.2 inch, more preferably 0.01 inch$\leq T \leq$0.1 inch, still more preferably 0.02 inch$\leq T \leq$0.07 inch, and yet still more preferably 0.02 inch$\leq T \leq$0.05 inch.

According to embodiments, a golf ball may have a Professional Golf Association (PGA) compression C in a range of $40 \leq C \leq 100$, preferably $45 \leq C \leq 95$, more preferably $50 \leq C \leq 90$, or at least less than or equal to 90.

According to embodiments, a golf ball may have a coefficient of restitution (COR) greater than 0.780, preferably greater than 0.790, more preferably greater than 0.795.

In some aspects, the core may have a hardness gradient from a center of the core to a surface of the core such that a hardness of the center of the core is greater than or less than a hardness of the surface of core by 2 Shore C unit.

Aspects of the disclosed invention relate to a method of producing a golf ball comprising at least one core, at least one intermediate layer, and at least one cover layer. The method may comprise fusing half shells by an ultrasonic welding process to form the at least one intermediate layer; and compression molding the at least one cover layer to provide dimples thereon, wherein the cover layer comprises one or more materials selected from the group consisting of thermoplastic resin, thermoset elastomer, thermoplastic elastomer, unsaturated polymer, and any combination of those. The method further may comprise fusing a second pair of half-shells by an ultrasonic welding process to form the at least one cover layer.

In one aspect, a hardness of the at least one intermediate layer may be greater than or less than a hardness of the cover layer at least by 2 Shore D. In another aspect, a PGA compression C of the core may be less than or equal to 90.

In an embodiment, the at least one intermediate layer may comprise at least two sub-intermediate layers, each having different chemical or mechanical characteristics. In one aspect, an outermost one of the at least two sub-intermediate layers may have a hardness at least 2 Shore D greater than or less than a hardness of an inner one of the at least two sub-intermediate layers.

In an embodiment, the at least one cover layer may comprise at least two sub-inner cover layers, each having different chemical or mechanical characteristics. In one aspect, an outermost one of the at least two sub-inner cover layers has a hardness at least 2 Shore D greater than or less than a hardness of an inner one of the at least two sub-inner cover layers.

In one aspect, a hardness of the intermediate layers may be greater than or less than a hardness of the cover layer by at least 2 Shore D.

In one aspect, a hardness of an outermost one of the at least two sub-intermediate layers may be greater than or less than a hardness of the cover layer by at least 2 Shore D.

In one aspect, a hardness of an innermost one of the at least two sub-intermediate layers may be greater than or less than a hardness of the cover layer by at least 2 Shore D.

Embodiments of the disclosed invention also relate to a method of producing a golf ball comprising a core, at least one outer core layer, at least one intermediate layer formed by injection molding or compression molding, and at least one cover layer, the method comprising forming the at least one cover layer by fusing half shells by ultrasonic welding and compression molding the fused half shells to provide dimples on the at least one cover layer, wherein the at least one cover layer comprises one or more of thermoplastic resin, thermoset elastomer, thermoplastic elastomer, ionomer, polyurethane, polyurethaneurea, and unsaturated polymer.

In an embodiment, the at least one intermediate layer is formed by injection molding or compression molding, wherein the at least one intermediate layer comprises at least two sub-intermediate layers, each having different chemical or mechanical characteristics. In one aspect, an outermost one of the sub-intermediate layers has a hardness at least 2 Shore D greater than or less than a hardness of an inner one of the sub-intermediate layers. In another aspect, each of the half-shells that form the at least one cover layer has multiple sub-inner shells each having different chemical or mechanical characteristics. In yet another aspect, an outermost one of the sub-inner shells forming the at least one cover layer has a hardness at least 2 Shore D greater than or less than a hardness of an inner one of the sub-inner shells forming the at least one cover layer. In still another aspect, the hardness of the at least one intermediate layer is greater than or less than the hardness of the at least one cover layer by at least 2 Shore D.

In one aspect, a hardness of the at least one intermediate layer may be greater than or less than a hardness of the cover layer at least by 2 Shore D. In another aspect, a PGA compression C of the core may be less than or equal to 90.

In an embodiment, the at least one intermediate layer may comprise at least two sub-intermediate layers, each having different chemical or mechanical characteristics. In one aspect, an outermost one of the at least two sub-intermediate layers may have a hardness at least 2 Shore D greater than or less than a hardness of an inner one of the at least two sub-intermediate layers.

In an embodiment, the at least one cover layer may comprise at least two sub-inner cover layers, each having different chemical or mechanical characteristics. In one aspect, an outermost one of the at least two sub-inner cover layers has a hardness at least 2 Shore D greater than or less than a hardness of an inner one of the at least two sub-inner cover layers.

In one aspect, a hardness of the intermediate layers may be greater than or less than a hardness of the cover layer by at least 2 Shore D.

In one aspect, a hardness of an outermost one of the at least two sub-intermediate layers may be greater than or less than a hardness of the cover layer by at least 2 Shore D.

In one aspect, a hardness of an innermost one of the at least two sub-intermediate layers may be greater than or less than a hardness of the cover layer by at least 2 Shore D.

Aspects of the disclosed invention relate to a method of producing a golf ball comprising at least one core, at least one intermediate layer, and at least one cover layer, the method comprising fusing half shells by an ultrasonic welding process to form the at least one cover layer; and compression molding the at least one cover layer to provide dimples thereon, wherein the cover layer comprises one or more materials selected from the group consisting of thermoplastic resin, thermoset elastomer, thermoplastic elastomer, unsaturated polymer, and any combination of those; a Shore D hardness H of the at least one intermediate layer is in the range of $20 \leq H \leq 90$; a Shore D hardness $H_c$ of the at least one cover layer is in the range of $20 \leq H_c \leq 80$; a thickness T of the at least one cover layer is in a range of 0.003 inch $\leq T \leq 0.25$ inch; a PGA compression C of the golf ball is in a range of $40 \leq C \leq 100$; and a C.O.R. (Coefficient of Restitution) of the golf ball is greater than 0.780.

The following description provides examples of application of ultrasonic welding to golf ball manufacture, as well as numerous examples of materials for the cover layer as well as for one or more intermediate layers. These layers are basically one form of plastic or another. In addition, for the joining of half shells in the course of manufacture, no intermediate material, such as epoxy or other adhesive is provided. Effectively, the vibrations that ultrasonic welding creates in the pieces being joined result in substantial heat, so that parts are effectively fused together. Consequently, in the following description, one or more forms of the term "welding" may appear, or one or more forms of the term "fusion" may appear. For purposes of the following description, the terms are intended to be interchangeable.

In many applications of ultrasonic welding, parts to be bonded will be held together under pressure, and ultrasonic energy applied to effect the welding. Normally, the parts are held under pressure between a fixed shaped base, often referred to as an anvil, and a source of the high frequency vibrations, often referred to as a horn or a sonotrode connected to a transducer. The transducer causes acoustic vibration to be emitted. In one aspect, when welding plastics of the type used for golf ball covers and intermediate layers as described herein, the interface of the pieces being welded will be configured to concentrate and thereby facilitate the fusion process. Ultrasonic welding of thermoplastics causes local melting of the plastic as a result of heat caused by vibrational energy along the joint to be welded.

Looking more closely at ultrasonic welding systems of the type used in embodiments of the present invention, the basic elements are:
1. Structure that holds, under pressure, the parts to be welded.
2. A base, often called an anvil as noted above, on which parts to be welded are placed. As discussed herein, the base or anvil for the ultrasonic welding process according to embodiments will hold one of the half-shells to be welded by allowing the high frequency vibrations to be directed to the interface to be welded. Such a structure for holding a half shell as discussed herein may be referred to as a nest or a fixture.
3. A power supply delivers a high power electrical signal. In some embodiments, the frequency of the electrical signal matches a resonance frequency of a welding stack, mentioned below.
4. A welding stack whose elements are tuned to resonate at the same ultrasonic frequency. In some embodiments, the stack includes:
   a. A converter that converts energy from the power supply to acoustic vibrations, using a piezoelectric effect. In one aspect, a piezoelectric transducer effects the conversion.
   b. In some embodiments, a booster modifies the amplitude of the vibrations, usually mechanically. In some ultrasonic welding systems, the booster also is used to clamp the stack together.
   c. A horn, or sonotrode, that may follow the shape of the parts being welded, provide further amplification of the vibrations, and apply the vibrations to the parts to be welded.
5. A controller controls movement of the structure holding together the pieces to be welded, and also controls delivery of ultrasonic energy to effect welding or fusion.

In accordance with embodiments of the invention, a method of producing a golf ball comprises performing ultrasonic welding on two half shells to form a layer selected from the group consisting of at least one intermediate layer, at least one cover layer, or at least one intermediate layer and at least one cover layer, wherein the intermediate layer and/or cover layer comprises at least one material selected from the group consisting of thermoplastic resin, resin mixture, reactive resin, resin blended with reactive chemicals to bring a cure, or resin having diene group in a structure mixed with free-radical initiators and/or crosslinking chemicals.

According to some aspects, the composition of at least one intermediate layer and/or cover layer may comprise polymer selected from the group consisting of thermoplastic polyurethane, thermoset polyurethane, polyurethane urea, polyurea, polyamide elastomer, thermoplastic copolyetherester block copolymer, thermoplastic copolyesterester block copolymer, polyethylene-octene, polybutylene-octene, polyoctenamer, polyisoprene, polybutadiene, 1,2-syndiotactic polybutadiene, thermoplastic vulcanizate, ionomer, copolymeric ionomer, terpolymeric ionomer, bimodal ionomer, modified ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene copolymer, ethylene-propylene-diene terpolymer (EPDM), ethylene vinyl acetate, ethylene-vinyl acetate copolymers (EVA), polysiloxane, and combinations thereof.

In accordance with embodiments of the invention, the method may further comprise:
1. pressing the two half shells together;
2. delivering a high power electrical signal to a welding stack; and
3. converting the high power electrical signal at the welding stack to ultrasonic energy.

In accordance with embodiments of the invention, the method may further comprise:
a. converting the high power electrical signal into a mechanical vibration;
b. modifying an amplitude of the mechanical vibration to generate a modified mechanical vibration; and
c. applying the modified mechanical vibration to an interface of the two half shells to weld them together ultrasonically.

Ultrasonic welding is carried out at a range of frequencies, selected to provide the necessary ultrasonic energy to fuse them together appropriately. In embodiments, the range of frequencies is greater than 5 kHz and less than 100 MHz, preferably greater than 10 kHz and less than 95 MHz, more preferably greater than 15 kHz and less than 90 MHz, and still more preferably greater than 20 kHz and less than 80 MHz.

Duration of application of the ultrasonic frequency also is in a range, selected to provide enough ultrasonic energy to ensure that there is enough heat, for a long enough time, for the pieces to fuse together appropriately. The range may be from 0.1 sec. to 60 sec., preferably from 0.3 sec. to 40 sec., more preferably from 0.5 sec. to 30 sec., and still more preferably from 1 sec. to 20 sec.

In one aspect, at least one pair of half shells at a time are fused together per molding cycle. Preferably, at least four pairs of half shells at a time are fused together per molding cycle. More preferably, more than 10 pairs of half shells at a time are fused together per molding cycle. Still more preferably, more than 20 pairs of half shells at a time are fused together per molding cycle.

Following are examples of application of ultrasonic welding to golf ball manufacture according to embodiments:
1. A core is inserted between two half-shells, which are fused together by ultrasonic welding to form a cover layer. Dimples then are formed in the cover layer by compression molding, applying heat and pressure.
2. A core is inserted between two half-shells, which are fused together by ultrasonic welding to form at least one intermediate layer. A cover layer, with dimples, then is formed by injection molding, compression molding, or casting.
3. A mantled core is inserted between two half-shells, which are fused together by ultrasonic welding to form at least one inner cover layer. At least one outer cover layer, with dimples, then is formed by injection molding, compression molding, or casting.
4. A core with at least one intermediate layer is inserted between two half-shells, which are fused together by ultrasonic welding process to form a cover layer. Dimples then are formed in the cover layer by compression molding, applying heat and pressure.
5. A core with at least one intermediate layer and at least one inner cover layer is inserted between two half-shells, which are fused together by ultrasonic welding to form a cover layer. Dimples then are formed in the cover layer by compression molding, applying heat and pressure.
6. A core is inserted between two half-shells of each inner cover layer and outer cover layer, which are fused together by ultrasonic welding to form an inner cover layer and an outer cover layer. Dimples then are formed in the outer cover layer by compression molding, applying heat and pressure.
7. A core is inserted between two half-shells of each inner-intermediate layer and outer-intermediate layer, which are fused together by ultrasonic welding to form an inner-intermediate layer and an outer-intermediate layer. At least one outer cover layer, with dimples, is formed by injection molding, compression molding, or casting.
8. A core with at least one intermediate layer is inserted between two half-shells of each inner cover layer and outer cover layer, which are fused together by ultrasonic welding to form an inner cover layer and an outer cover layer. Dimples then are formed in the outer cover layer by compression molding, applying heat and pressure.

Particular dimple sizes, shapes, patterns, and arrangements are not critical to the present disclosure. A golf ball made according to some embodiments may have dimples with different depths and/or different diameters. In an embodiment, the dimples may have at least three different diameters. In an embodiment, at least about 70% of the dimples may have a diameter of about 0.11 inches or greater. In an embodiment, the dimples may have at least three different depths. In an embodiment, 70% or more of the dimples may have a depth greater than 0.004 inches. In an embodiment, dimples may cover more than 80% of a golf ball's outer surface. In an embodiment, the total number of dimples is between about 300 and about 430, or between 300 and 420. In an embodiment, the total chordal dimple volume is between 370 and 385.

The half-shells themselves may be formed in a variety of manners, including but not limited to an injection molding process with a cold runner system; an injection molding process with a hot runner system; a reaction injection molding process; a gas-assisted injection molding process; a co-injection molding process; an insert-injection molding process; a casting process; a compression molding process; a vacuum forming process; a transfer molding process, or some combination of two or more of these.

Alternatively, the half-shells may be formed by a vacuum forming process or a transfer molding process with a thermoplastic sheet. The thermoplastic sheet may have a thickness in a range from 0.01 to 0.1 inches, preferably 0.015 to 0.09 inches, more preferably 0.02 to 0.08 inches, and most preferably 0.025 to 0.07 inches. The thermoplastic sheet may have melting temperature or softening temperature in a range from 40° C. to 350° C., preferably 50° C. to 300° C., more preferably 60° C. to 250° C., most preferably 70° C. to 200° C.

FIG. 1 shows a top view of an array 100 of halves of a layer to be formed by ultrasonic welding in accordance with an embodiment. A layer 110 may be an intermediate layer or a cover layer. In an embodiment, 110 may be the outermost layer of a cover which has other material disposed within it. Extensions 120 result from forming a plurality of layer halves 100 in a mold, as will be known to ordinarily skilled artisans. The number of layer halves made at a time can vary in different embodiments.

FIG. 2A illustrates a side view opposed layer halves 210, 220 with extensions 215, surrounding a center 230 which may be constituted by a core. The opposed layer halves may constitute a core layer, an intermediate layer, or a cover layer. The center 230 may include not only a core, but a core layer, one or more intermediate layers, and (in the case of a golf ball with multiple cover layers) a cover layer.

FIG. 2B shows a top view of a layer half 210 with extensions 215, and a center 230. The layer half 210 and center 230 may be as described in FIG. 2A. FIG. 2C shows a side view of an assembly 250 after layer halves 210, 220 and center 230 from FIG. 2A are brought together and assembled using ultrasonic welding. FIG. 2D shows a top view of an assembly 270 of a plurality of assemblies 250.

According to embodiments, layer thicknesses and diameters, hardnesses, coefficients of restitution, and materials may be selected in accordance with desired golf ball performance, as is the case with golf balls manufactured according to other methods. Some important differences are that golf balls made by ultrasonic welding as described herein have more consistent and uniform construction and enjoy more consistent performance.

Figure 3:
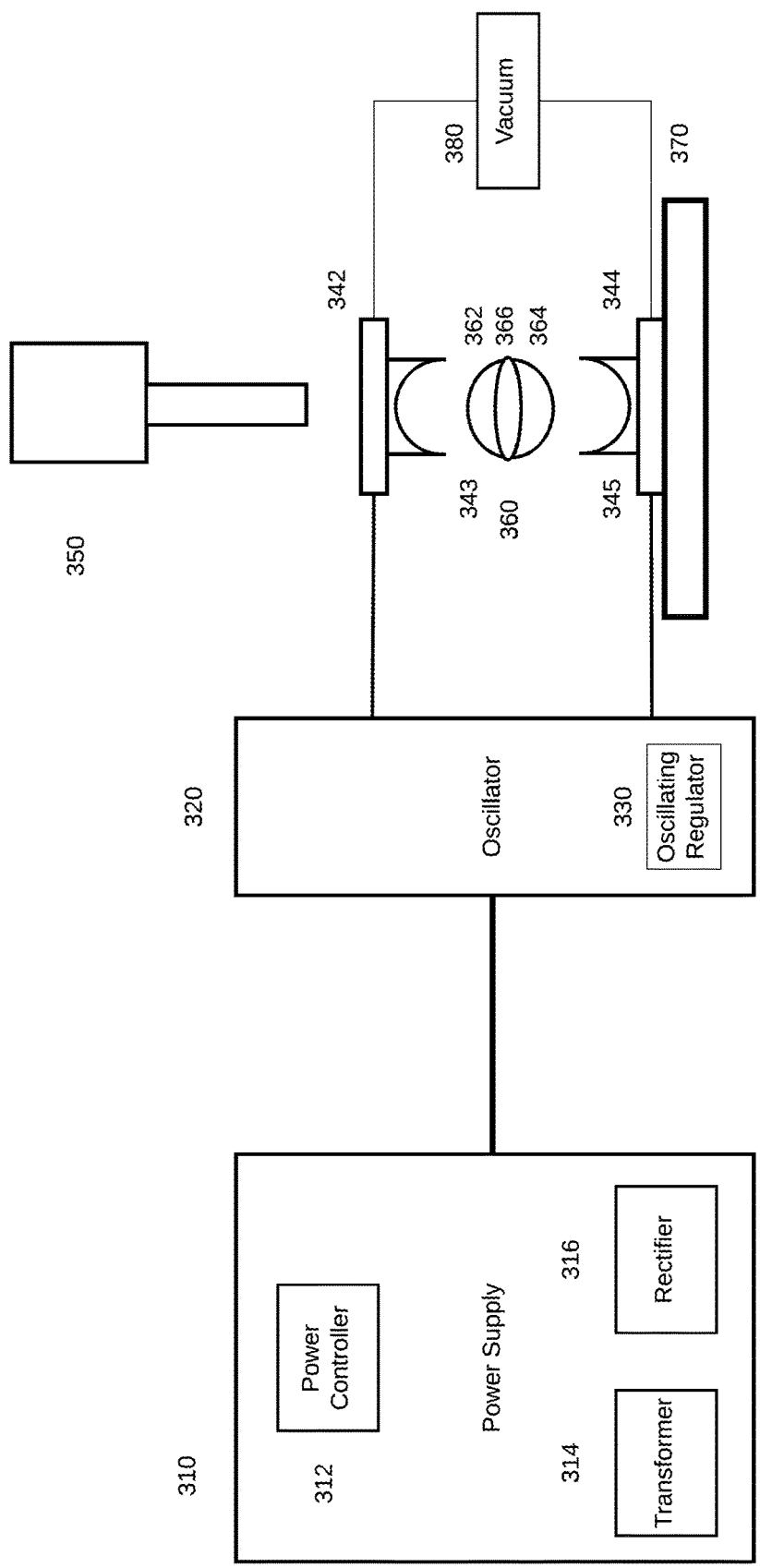
FIG. 3 shows exemplary apparatus for golf ball manufacture according to embodiments.

FIG. 3 is a high level diagram of an apparatus 300 for performing ultrasonic welding of golf ball components according to an embodiment. In FIG. 3, a power supply 310 includes a power controller 312, a high voltage transformer 314, and a rectifier 316. In an embodiment, power supply 310 receives 380V from a source. Different voltages also are possible. In an embodiment, power supply 310 may receive a voltage available at a common wall socket. In different parts of the world, that may be 100-120V, or 220-240V, for example. The voltage passes through power controller 312 to transformer 314, which boosts the voltage substantially, according to an embodiment. Transformer 314 may boost the voltage either more substantially or less substantially than this, depending on the embodiment. Rectifier 316 converts voltage from transformer 314 to DC voltage.

DC voltage output from power supply 310 passes to oscillator 320, which in an embodiment includes oscillating regulator 330, to produce the high-frequency energy necessary to effect ultrasonic welding. In operation, when upper and lower mold plates 342, 344 are forced together by operation of pressurized cylinder/piston 350, upper and lower half-shells 362, 364 come together by virtue of upper mold plate 342 being forced against lower mold plate 344, where lower mold plate 344 is positioned on flat surface 370 (sometimes referred to as an anvil). In an embodiment, outputs of oscillator 320 pass to upper and lower mold plates 342, 344 to impart high-frequency energy to the upper and lower half-shells 362, 364 so that the half-shells are welded together ultrasonically. Ultrasonic welding occurs around circumference 366, to form a resulting shell 360. In an embodiment, only one of the upper and lower mold plates 342, 344 receives an output from oscillator 320, so that only one of the half-shells receives the high-frequency energy to effect the ultrasonic welding.

Upper and lower mold plates 342, 344 have respective half-shell cavities 343, 345 which accommodate upper and lower half-shells 362, 364. There may be multiple ones of such cavities in each of the upper and lower mold plates, so that more than one ultrasonic welding process at a time may be carried out. In an embodiment, as many as 20 such cavities may be provided in each of the upper and lower mold plates.

To facilitate removing any trapped air between the inserted core or mantle and the half shells being fused together, one or more through holes (in an embodiment, as many as three) may be provided in each half shell cavity. A vacuum, through vacuum pump 380, provides vacuum through the through holes to remove any trapped air between the inserted core or mantle and the half shells during ultrasonic welding process. For ease of description, a welding operation for a single pair of half-shells is shown and described herein. For multiple half-shells, such as shown in FIG. 1 and FIG. 2D, upper and lower cavities for all of the half-shells may be part of a larger assembly for which a single pressurized cylinder or piston, or multiple pressurized cylinders or pistons, force the upper cavities against the lower cavities, with the lower cavities placed on a larger flat surface or anvil.

Figure 4B:
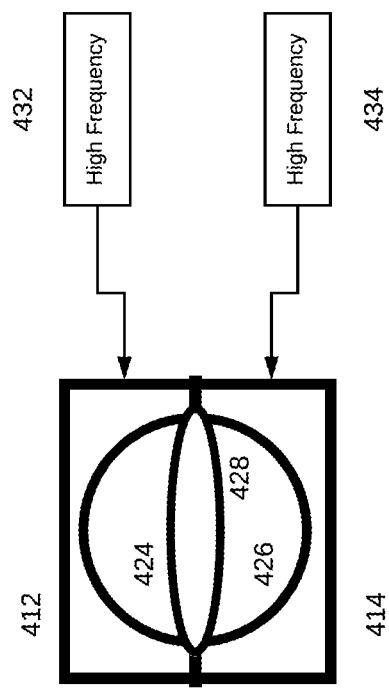
FIGS. 4A and 4B show additional detail to highlight manufacture of a golf ball, or portions thereof, according to embodiments.
Figure 4A:
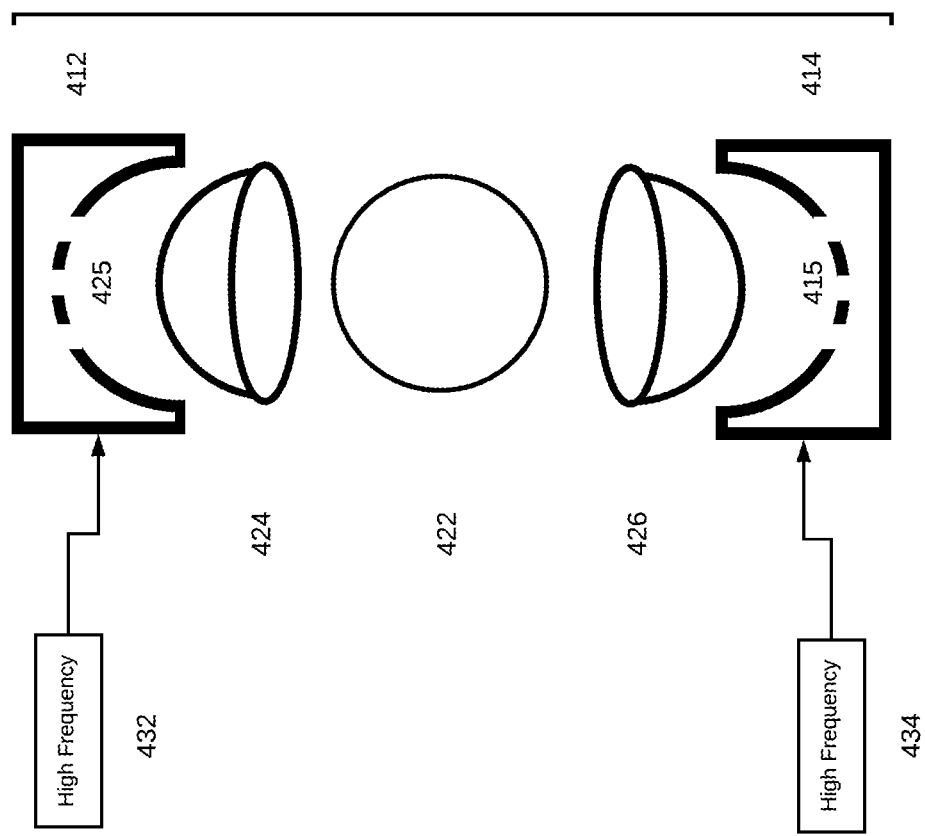

Looking in more detail at the upper/lower cavity configuration in FIG. 3, with reference to another example of ultrasonic welding in the context of golf ball construction, FIG. 4A shows upper mold plate 412 and lower mold plate 414, with a core or mantle 422 positioned therebetween, and with upper and lower half-shells 424, 426 above and below core/mantle 422. When upper and lower mold plates 412, 414 are forced together as shown in FIG. 4B, using a cylinder or piston such as that shown in FIG. 3, high frequency sources 432, 434, connected respectively to upper mold plate 412 and lower mold plate 414, impart high frequency energy to upper and lower half-shells 424, 426 so as to weld them together ultrasonically around core/mantle 422. The weld is provided around circumference 428. As noted above with respect to FIG. 3, in an embodiment, only one of the upper and lower mold plates 412, 414 receives an output from the oscillator, so that only one of the half-shells receives the vibrations to effect the ultrasonic welding.

FIG. 4A also shows through holes 415 in lower mold 414, and through holes 425 in upper mold 424, through which a vacuum may be applied via vacuum pump 380 in FIG. 3.

In an embodiment, the upper and lower mold plates in FIG. 3, and the upper and lower mold plates in FIGS. 4A and 4B, are electrically insulated from each other.

Figure 5A:
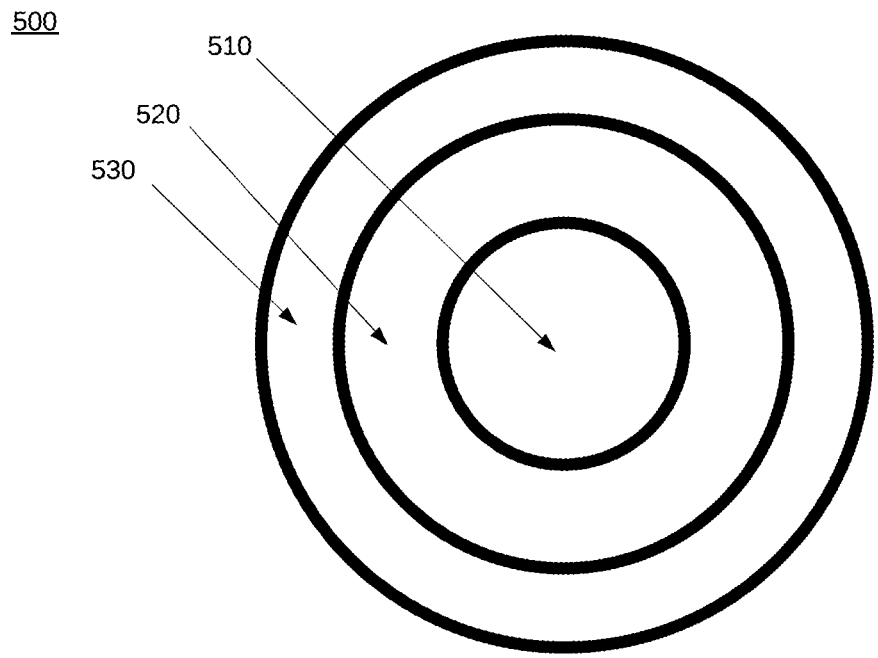
FIGS. 5A-5D show cross-sections of a golf ball according to one or more embodiments.

FIG. 5A shows a golf ball 500 according to embodiments. In FIG. 5A, the golf ball 500 has three layers: a core 510; an intermediate layer 520; and a cover layer 530. The materials for these various layers may be as discussed earlier. Any or all of the layers may be formed by ultrasonic welding of opposing halves or half shells. Compression molding of dimples on the cover layer 530 may be provided. The dimples may have dimensions, and may be of a number as set forth earlier in this specification.

Figure 5B:
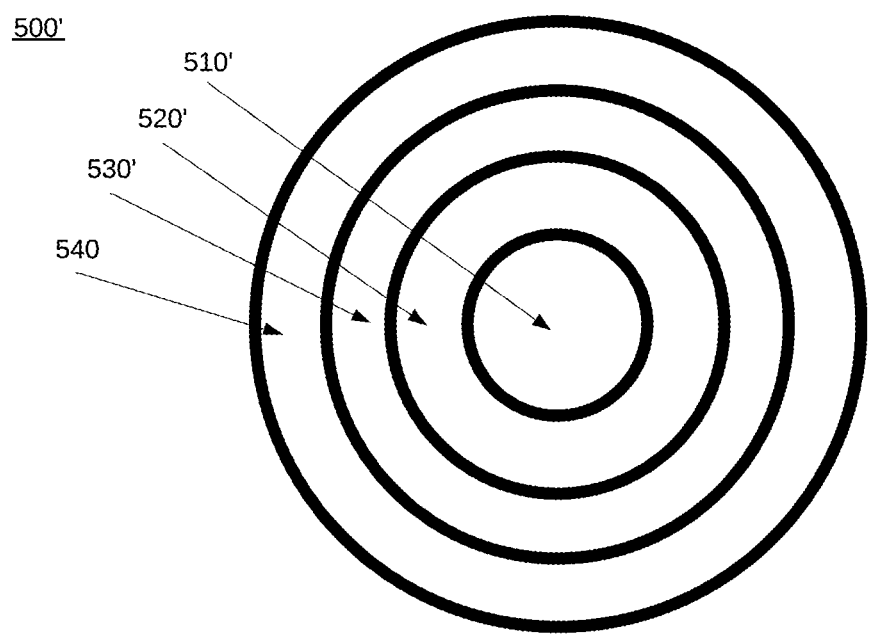

FIG. 5B shows a golf ball 500' according to embodiments. In FIG. 5B, the golf ball 500' has four layers: a core 510'; an outer core layer or intermediate layer 520'; a second intermediate layer or inner cover layer 530'; and a cover layer or outer cover layer 540. The materials for these various layers may be as discussed earlier. Any or all of the layers may be formed by ultrasonic welding of opposing halves or half shells. Compression molding of dimples on the layer 540 may be provided.

Figure 5C:
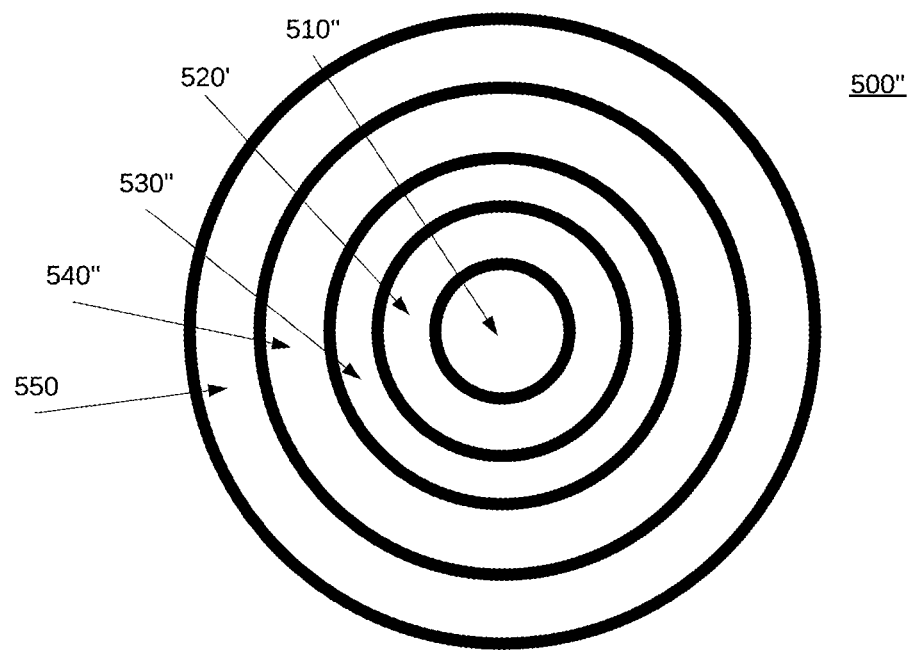
Figure 5D:
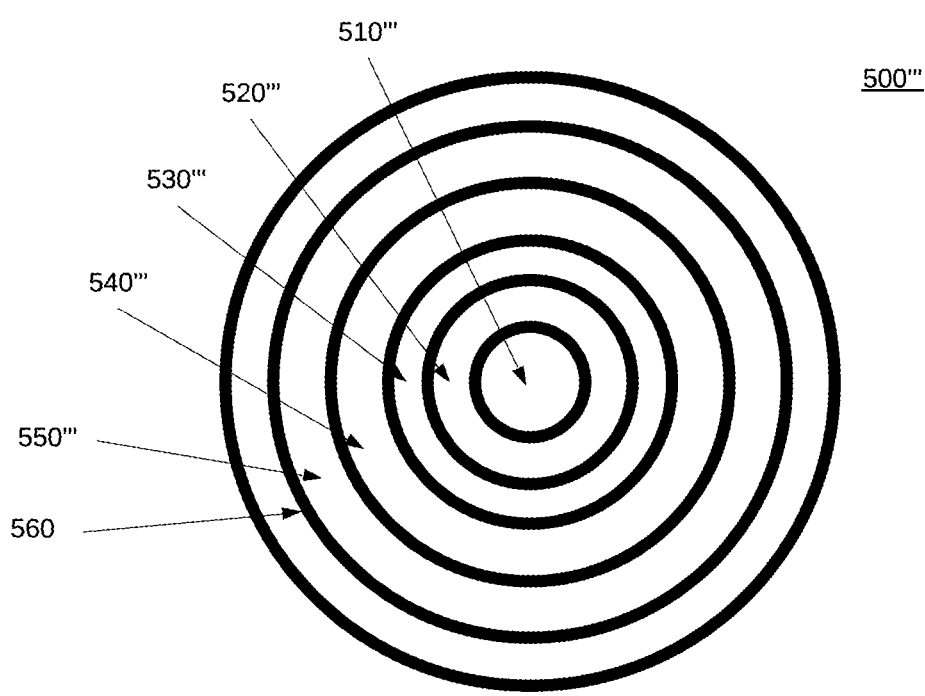

In many embodiments, golf ball 500, 500' will have either three or four layers. Some golf balls may have more layers. FIG. 5C shows a golf ball 500" with five layers, and FIG. 5D shows a golf ball 500''' with six layers. As with the golf ball of FIG. 5B, the layers between the core and the cover layer may be called various things (e.g. outer core; outer or inner intermediate layer; inner cover layer). The chemical and physical characteristics of these layers, ranges of these characteristics being described in various places in the specification, matter more than the actual name. Any or all of the layers may be formed by ultrasonic welding of opposing halves or half shells. Compression molding of dimples on the cover layer or outermost cover layer 550, 560 may be provided.

Thickness of the various layers can vary in accordance with chemical composition (various materials having been described previously) and/or physical attributes of the golf ball (e.g. hardness, coefficient of restitution, PGA compression). According to embodiments, a golf ball may have one or more cover layers with a thickness T in a range of 0.003 inch≤T≤0.25 inch, preferably 0.005 inch≤T≤0.2 inch, more preferably 0.01 inch≤T≤0.1 inch, still more preferably 0.02 inch≤T≤0.07 inch, and yet still more preferably 0.02 inch≤T≤0.05 inch. The formation of cover layers and other layers by ultrasonic welding of half shells has been discussed earlier in the specification. The half-shells may be formed of thermoplastic sheets. These sheets may have a thickness in a range from 0.01 to 0.1 inches, preferably 0.015 to 0.09 inches, more preferably 0.02 to 0.08 inches, depending on the layer of the golf ball for which the half-shells are being fused together (e.g. cover layer, intermediate layer, outer core layer), and of course the above-mentioned chemical composition and/or physical attributes of the golf ball or of the layer in question.

While numerous embodiments in accordance with different aspects of the invention have been described in detail, various modifications within the scope and spirit of the invention will be apparent to ordinarily skilled artisans. In particular, certain methods are disclosed, as well as individual steps for performing those methods. It should be understood that the invention is not limited to any particular disclosed sequence of method steps. Consequently, the invention is to be construed as limited only by the scope of the following claims.

What is claimed is:

1. A method of producing a golf ball, the golf ball comprising at least one core, at least one intermediate layer around the at least one core, and at least one cover layer, the method comprising fusing half shells positioned around the at least one core by an ultrasonic welding process to form the at least one intermediate layer around the at least one core; and injection molding or compression molding the at least one cover layer to provide dimples thereon, wherein the cover layer comprises one or more materials selected from the group consisting of thermoplastic resin, thermoset elastomer, thermoplastic elastomer, unsaturated polymer, and any combination of those; a melting temperature or softening temperature of the at least one cover layer is in a range from 40° C. to 350° C., a Shore D hardness H of the at least one intermediate layer is in the range of 20≤H≤90; a Shore D hardness $H_c$ of the at least one cover layer is in the range of $20 \leq H_c \leq 80$; a thickness T of the at least one or more intermediate layers is in a range of 0.003 inch$\leq T \leq 0.25$; a thickness $T_c$ of the at least one cover layer is in a range of 0.003 inch$\leq T_c \leq 0.25$ inch; a PGA compression C of the golf ball is in a range of $40 \leq C \leq 100$; and a C.O.R. (Coefficient of Restitution) of the golf ball is greater than 0.780.

2. A method of producing a golf ball, the golf ball comprising a core, at least one intermediate layer formed by injection molding or compression molding, and at least one cover layer around the at least one intermediate layer, the method comprising forming the at least one cover layer by fusing half shells positioned around the at least one intermediate layer by ultrasonic welding and compression molding the fused half shells to provide dimples on the at least one cover layer, wherein the at least one cover layer comprises one or more of thermoplastic resin, thermoset elastomer, thermoplastic elastomer, ionomer, polyurethane, polyurethane urea, and unsaturated polymer; a melting temperature or softening temperature of the cover layer is in a range from 40° C. to 350° C., a Shore D hardness H of the at least one intermediate layer is in the range of $20 \leq H \leq 90$; a Shore D hardness $H_c$ of the at least one cover layer is in the range of $20 \leq H \leq 80$; a thickness T of the at least one or more intermediate layers is in a range of 0.003 inch$\leq T \leq 0.25$ inch; a thickness $T_c$ of the at least one cover layer is in a range of 0.003 inch$\leq T_c \leq 0.25$ inch; a PGA compression C of the golf ball is in a range of $40 \leq C \leq 100$; and a C.O.R. (Coefficient of Restitution) of the golf ball is greater than 0.780.

3. The method of claim 2, wherein the Shore D hardness $H_c$ of the cover layer is in a range of $30 \leq H_c \leq 70$.

4. The method of claim 2, wherein the Shore D hardness $H_c$ of the cover layer is in a range of $40 \leq H_c \leq 60$.

5. The method of claim 2, wherein the thickness $T_c$ of the cover layer is in a range of 0.005 inch$\leq T_c \leq 0.2$ inch.

6. The method of claim 2, wherein the thickness $T_c$ of the cover layer is in a range of 0.02 inch$\leq T_c \leq 0.05$ inch.

7. The method of claim 2, wherein a PGA compression C of the core is less than or equal to 90.

8. The method of claim 2, wherein the core has a hardness gradient from a center of the core to a surface of the core such that a hardness of the center of the core is greater than a hardness of the surface of the core by 2 Shore C unit.

9. The method of claim 2, wherein the core has a hardness gradient from a surface of the core to a center of the core such that a hardness of the surface of the core is greater than the hardness of the center of the core by 2 Shore C unit.

10. The method of claim 2, wherein the at least one intermediate layer comprises at least two sub-intermediate layers, each having different chemical or mechanical characteristics.

11. The method of claim 10, wherein an outermost one of the sub-intermediate layers has a hardness at least 2 Shore D greater than a hardness of an inner one of the sub-intermediate layers.

12. The method of claim 10, wherein an outermost one of the sub-intermediate layers has a hardness at least 2 Shore D less than a hardness of an inner one of the sub-intermediate layers.

13. The method of claim 2, wherein each of the half-shells that form the at least one cover layer has multiple sub-inner shells each having different chemical or mechanical characteristics.

14. The method of claim 13, wherein an outermost one of the sub-inner shells forming the at least one cover layer has a hardness at least 2 Shore D greater than a hardness of an inner one of the sub-inner shells forming the at least one cover layer.

15. The method of claim 13, wherein an outermost one of the sub-inner shells forming the at least one cover layer has a hardness at least 2 Shore D less than a hardness of an inner one of the sub-inner shells forming the at least one cover layer.

16. The method of claim 2, wherein the hardness of the at least one intermediate layer is greater than the hardness of the at least one cover layer by at least 2 Shore D.

17. The method of claim 2, wherein the hardness of the at least one intermediate layer is less than the hardness of the at least one cover layer by at least 2 Shore D.

18. The method of claim 10, wherein a hardness of an innermost one of the at least two sub-intermediate layers is greater than a hardness of the at least one cover layer by at least 2 Shore D.

19. The method of claim 10, wherein a hardness of an innermost one of the at least two sub-intermediate layers is less than a hardness of the at least one cover layer by at least 2 Shore D.

20. The method of claim 2, wherein the at least one cover layer comprises polyurethane selected from the group consisting of (a) a reaction product of a diisocyanate or polyisocyanate with a polyol; (b) a reaction product of isocyanate-terminated polyurethane with a polyamine; or (c) combinations of (a) and (b).

21. The method of claim 2, wherein the intermediate layer comprises thermoplastic resin selected from the group consisting of ionomer, copolymeric ionomer, terpolymeric ionomer, partially neutralized ionomer, fully neutralized ionomer, unimodal ionomer, bimodal ionomer, modified unimodal ionomer, modified bimodal ionomer, polyester resins, polyamide elastomer resins, polyurethane, polyurethane-urea, polyurea, polyamide ionomer, polyurethane ionomer, thermoplastic copolyetherester block copolymer, thermoplastic copolyesterester block copolymer, synthetic rubber, thermoplastic vulcanizate, ionomer, polycarbonate, polyolefin, polyamide, copolymeric polyamide, polyester, polyvinyl alcohol, acrylonitrile-butadiene-styrene copolymer, polyarylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, ethylene-octene copolymer, butylene-octene copolymer, and polysiloxane; and miscellaneous ingredients comprising materials selected from the group consisting of organic fillers, inorganic fillers, nano-filler, graphene, carbon nanotube, and combinations thereof.

22. The method of claim 2, wherein the core comprises: (a) an unsaturated polymer with a Mooney viscosity ($ML_{1+4}(100°$ C.$)$) of from about 20 to about 80, the unsaturated polymer selected from the group consisting of 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, and combinations thereof; (b) a cross-linking agent that is present in an amount of from about 0.05 to about 5 parts by weight of the cross-linking agent per 100 parts by weight of the unsaturated polymer comprising; (c) a co-crosslinking agent that is present in an amount of from about 1 to about 50 parts by weight of the co-cross-linking agent per 100 parts by weight of the unsaturated polymer comprising a zinc salt or a magnesium salt of an unsaturated fatty acid having from 3 to 8 carbon atoms; (d) a peptizer, which (i) is present in an amount of from about 0.1 to about 10 parts by weight per 100 parts by weight of the unsaturated polymer, and (ii) is selected from the group consisting of pentachlorothiophenol, dibenzamido diphenyldisulfide, tetrachloropyridinethiol, a metal salt of pentachlorothiophenol, or a non-metal salt of pentachlorothiophenol; (e) an accelerator, which is present in an amount of from about 0.1 to about 10 parts by weight per 100 parts by weight of the unsaturated polymer; (f) a filler, which may be selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, other particulate carbonaceous materials, and combinations thereof; and (g) miscellaneous additives which are selected from the group of colorants, antioxidants, colorants, dispersants, mold releasing agents, processing aids, and combinations thereof.

23. A method of producing a golf ball, the golf ball comprising at least one core, at least one intermediate layer, and at least one cover layer around the at least one intermediate layer, the method comprising fusing half shells positioned around the at least one intermediate layer by an ultrasonic welding process to form the at least one cover layer around the at least one intermediate layer; and compression molding the at least one cover layer to provide dimples thereon, wherein the cover layer comprises one or more materials selected from the group consisting of thermoplastic resin, thermoset elastomer, thermoplastic elastomer, unsaturated polymer, and any combination of those; a Shore D hardness H of the at least one intermediate layer is in the range of $20 \leq H \leq 90$; a Shore D hardness $H_c$ of the at least one cover layer is in the range of $20 \leq \leq 80$; a thickness T of the at least one cover layer is in a range of $0.003$ inch $\leq T_c \leq 0.25$ inch; a PGA compression C of the golf ball is in a range of $40 \leq C \leq 100$; and a C.O.R. (Coefficient of Restitution) of the golf ball is greater than 0.780.

* * * * *